United States Patent [19]
Ito

[11] 3,835,428
[45] Sept. 10, 1974

[54] ELECTROMAGNETIC CHUCK DEVICE
[75] Inventor: Isao Ito, Tokyo, Japan
[73] Assignee: Nissin Precision Machines Co., Ltd., Tokyo-to, Japan
[22] Filed: Oct. 9, 1973
[21] Appl. No.: 404,182

[30] Foreign Application Priority Data
Apr. 14, 1973  Japan............................ 48-44211

[52] U.S. Cl. ............................... 335/288, 335/295
[51] Int. Cl. ......................................... H01f 7/02
[58] Field of Search ........... 335/285, 286, 288, 295

[56] References Cited
UNITED STATES PATENTS
| 1,343,751 | 6/1920 | Simmons | 335/287 |
| 2,405,773 | 8/1946 | Barrett | 335/287 |
| 2,442,136 | 5/1948 | Luther | 335/287 |

FOREIGN PATENTS OR APPLICATIONS
1,055,793  1/1967  Great Britain ..................... 335/288

Primary Examiner—G. Harris
Attorney, Agent, or Firm—Cushman, Darby & Cushman

[57] ABSTRACT

An electromagnetic chuck device comprising a flat surface for holding workpieces, a sine-bar, and an adjustable platform for carrying block-gauge, in order to precisely carry in the predetermined state workpieces to be subjected to machining operations. In this chuck device, a spindle portion of the magnetic chuck and the sine-bar being fitted to the spindle portion have a tapered profile to make coincident a rotating center of the magnetic chuck with that of the sine-bar upon assembly.

4 Claims, 4 Drawing Figures

PATENTED SEP 10 1974　　　　　　　　　　　　　3,835,428

3,835,428

ELECTROMAGNETIC CHUCK DEVICE

BACKGROUND OF THE INVENTION a. Field of the Invention

The present invention relates to a chuck device for holding tools and workpieces and is concerned more particularly with an electromagnetic chuck device for carrying workpieces to be subjected to machining operations such as surface grinding and milling.

b. Description of the Prior Art

The prior art includes an electromagnetic chuck device provided with a chuck which is rotatably supported by a pair of bearing devices fixed on a base, designed to decide the rotating angle of the chuck viz., the slant angle of the chuck surface on which the workpieces are carried by a sine-bar built in the device. However, from the functional point of view, such previous device is required to have a high processing accuracy of the composing parts or also a high assembly accuracy of the parts. Further in this previous device, as the platform for carrying block-gauges which is considered as the most important portion is fixed on the base, there still remain more difficulties in deciding precisely the slant angle of the chuck surface.

SUMMARY OF THE INVENTION

A primary object of the present invention is to provide an electromagnetic chuck device for holding tools and workpieces which is capable of accurate and quick adjustment as may be required of the work to be performed and which is capable of being adjusted by any machinist accustomed to using a sine-bar.

Accordingly, the invention comprises an electromagnetic chuck device for holding tools and workpieces comprising a base capable of being detachably fixed on the working table of a machine tool, an electromagnetic chuck being rotatably supported on the base and having a flat surface which is capable of holding tools and workpieces, a sine-bar means having a bar secured to one end of the chuck and enabling the relative position between the base and the chuck to be adjusted as required, means for locking the chuck to the base after setting has been achieved, and a platform for carrying block-gauge which is adjustably mounted on the base.

Other objects as well as the attendant advantages of the present invention will become apparent from the following detailed description of the preferred embodiments when taken in conjunction with the accompanying drawings.

DESCRIPTION OF THE PREFERRED EMBODIMENTS

Figure 1:
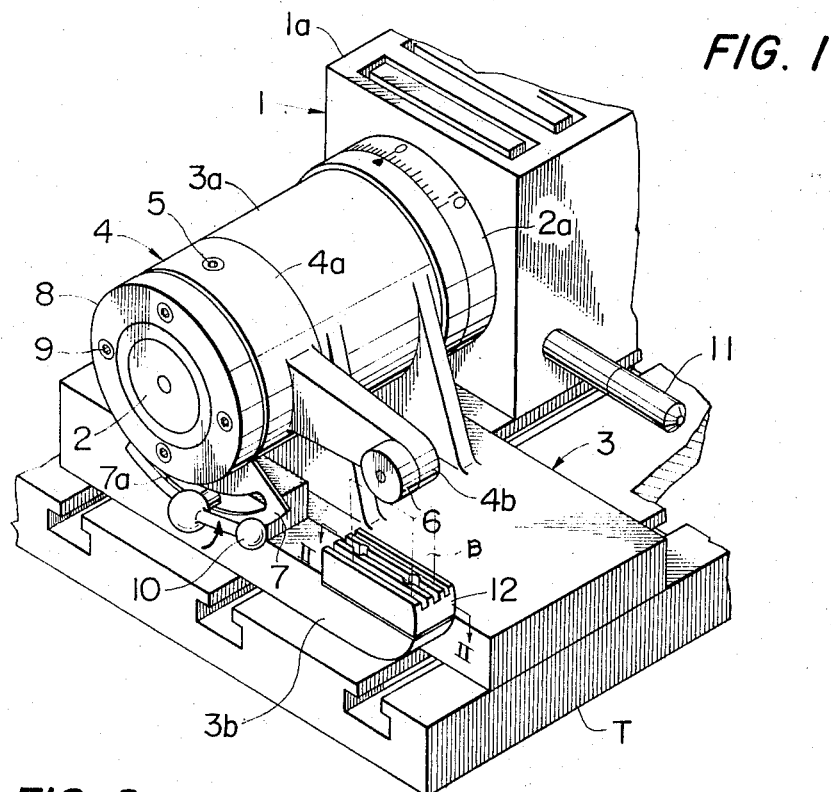
FIG. 1 is a perspective view illustrating the important parts of the electromangetic chuck device according to the present invention.
Figures 2, 3:
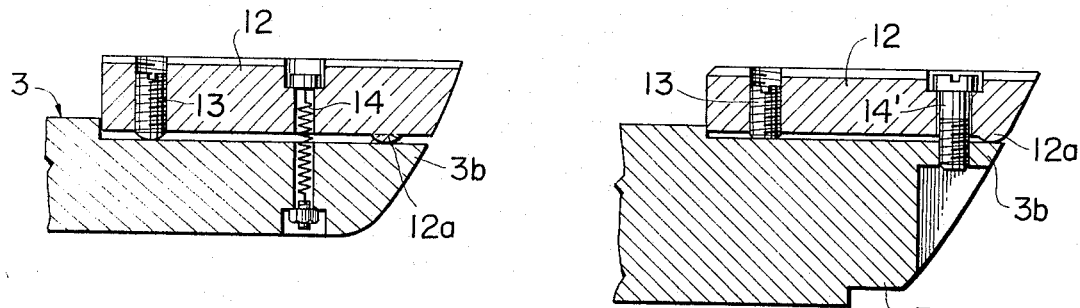
FIG. 2 is an enlarged sectional view along the line II — II of FIG. 1.
FIG. 3 is an enlarged sectional view similar to FIG. 2 illustrating another example of the present invention.
Figure 4:
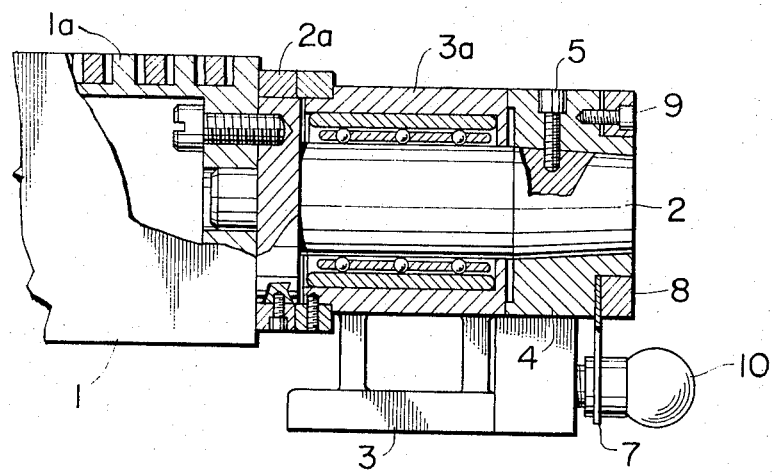
FIG. 4 is a partial sectional view illustrating the coupling construction between the spindle of the chuck and the sine-bar.

Referring to FIG. 1, numeral reference 1 represents a well-known electromagnetic chuck having a flat surface or a chuck surface 1a which is capable of carrying tools and workpieces. Numeral 2 represents a spindle being integrally attached to one end face of the chuck 1 and having a scale 2a on its peripheral surface. Numeral 3 represents a base which is adapted to be fixed on the table T of machining tool such as a milling machine by a not shown but well-known fixing member and having a bearing portion 3a rotatably supporting the spindle 2 and a mount portion 3b for supporting a platform 12 for carrying block gauge. To the other end face of the chuck 1, a spindle like the spindle 2 is integrally attached, and also is rotatably supported by a same bearing as the bearing 3a which is formed on the base 3. Numeral 4 represents a bar fitted to the end portion of the spindle 2 and having a ring portion 4a fixed to the spindle 2 by a screw 5 and an arm 4b which has the extension to the radius direction of the ring portion 4a. As shown in FIG. 4, the end portion of the spindle 2 has a tapered profile, and the inside surface of the ring portion 4a which is designed to be fitted to this end portion has also the same tapered profile. Accordingly, by the effects of these tapered profiles, upon fixing the ring portion 4a of the bar 4 to the end portion of the spindle 2, it is easy to make coincident an axis of the spindle 2 with the rotating center of the bar 4. Numeral 6 represents a roller fixed to the tip of the arm 4b, numeral 7 represents a resilient plate being fitted to the ring portion 4a and having an elongated sector portion in which an arcuate slot 7a is formed with the same center of the spindle 2. Numeral 8 represents a cover ring fitted to the ring portion 4a and also fixed to the ring portion 4a of the bar 4 by a screw 9 along with the plate 7. Numeral 10 represents a locking handle passed through the arcuate slot 7 a of the plate 7 and screwed into place at the end surface of the base 3. Numeral 11 represents an operating rod fixed to the chuck 1. By the manner as shown in FIGS. 2 and 3, the platform 12 for carrying block-gauge is adjustably mounted. Namely, as shown in FIG. 2, at one end portion of the lower surface of the platform 12, a knife-edge 12a is formed extending to the direction of its width, and the platform is adapted to be rocked making the contact line between the knife-edge 12a and the upper surface of the mount portion 3b as its fulcrum. Numeral 13 represents an adjusting screw being screwed into the other end portion of the platform 12 and being arranged for its top portion to contact to the upper surface of the mount portion 3b. Numeral 14 represents a coil spring being constrained between the platform 12 and the base 3 at the intermediate portion of the platform, and this spring is so useful in fixing the platform 12 on the base 3 as not to be moved on the mount portion 3b without intentional movement being undertaken by the operator. Reference symbol B represents a block-gauge being placed on the platform 12. Referring to FIG. 1, when the locking handle is rotated according to the arrow, the resilient plate is caught between the handle 10 and the end surface of the base 3, and is fixed. The roller 6 and the platform 12 are placed in order towards the perpendicular direction. The bar 4 which integrally rotates with the spindle 2 and the roller 6 fixed at the top of the arm 4b and the platform 12 comprise a sine-bar means. Description will hereunder be made on the functions of the aforesaid device. Upon setting the slant angle of the flat surface 1a, rotate at first the locking handle 10 towards the reverse direction of the arrow and then the locking state of the resilient plate 7 is released. As a result, the bar 4, resilient plate 7 and the cover ring 8 are led to rotate integrally with the spindle 2 viz., the chuck 1. Next, in accordance with the requested slant angle, rotate the chuck 1 viz., the bar 4 to the counter-clock wise direction through the operating rod 11, and put a block-gauge B of an adequate dimension on the platform 12. Then, to get an accurate slant angle of the flat surface 1a, rotate the bar 4 to the clock-wise direction and make the roller 6 contact the upper surface of the block-gauge B. After that, rotate the locking handle 10 according to the arrow, to fix the chuck 1 to that position and the setting operation of the angle is completed. Upon performing the above mentioned setting operation, the adjusting screw 13 may be rotated to make up and down motions by a driver or the like, the platform 12 is rocked using the knife-edge 12a as a fulcrum, and subtle level adjustment of the platform 12 can be easily performed.

Referring to FIG. 3, to fix the platform 12 to the base 3, there is used a screw 14' screwed through the platform 12 in the base 3. When adjusting the level of the platform 12, this screw 14' is unscrewed beforehand, and, upon the decision of the level, it is screwed in the base 3.

It should be understood that, as shown by the dotted line in FIG. 2, the knife-edge 12a may be formed on the mount portion 3b of the base 3.

According to the present invention, as already mentioned, not only fixes the slant angle of the chuck 1 rapidly and precisely, but it is easy to adjust the level of the platform for carrying block-gauge in the working place as required, so that these functional characteristics give such chuck device a full effect in operation and in practical usage.

I claim:

1. An electromagnetic chuck device for holding tools and workpieces comprising a base, a pair of bearing portions formed on said base, a magnetic chuck having a spindle rotatably supported by said bearing portion, a bar member fixedly mounted on said spindle, a resilient plate member secured to said bar member, a locking handle screwed in said base and capable of locking said resilient plate member, an adjustable platform mounted on said base to carry a block-gauge and a sine-bar means consisting of said bar member and said adjustable platform.

2. A chuck device for holding tools and workpieces according to claim 1, in which said adjustable platform is provided with an adjusting screw capable of contacting the upper surface of said base and screwed in said platform, a coil spring tensioned between said platform and said base, and a knife-edge formed on the lower surface of said platform.

3. A chuck device for holding tools and workpieces according to claim 1, in which said adjustable platform is provided with an adjusting screw capable of contacting the upper surface of said base and screwed in said platform, a fixing screw capable of fixing said platform on said base, and a knife-edge formed on the lower surface of said platform.

4. A chuck device for holding tools and workpieces according to claim 1, in which said spindle and said bar member to be mounted on said spindle are provided with a tapered portion, respectively.

* * * * *